United States Patent
Lafont et al.

(10) Patent No.: US 7,797,947 B2
(45) Date of Patent: Sep. 21, 2010

(54) MOUNTING ASSEMBLY FOR SECURING AN ENGINE TO AN AIRCRAFT WING

(75) Inventors: Laurent Lafont, Pechbusque (FR); Frederic Journade, Toulouse (FR)

(73) Assignee: AIRBUS France, Toulouse (FR)

(*) Notice: Subject to any disclaimer, the term of this patent is extended or adjusted under 35 U.S.C. 154(b) by 84 days.

(21) Appl. No.: 12/067,191

(22) PCT Filed: Sep. 26, 2006

(86) PCT No.: PCT/EP2006/066738
§ 371 (c)(1),
(2), (4) Date: Mar. 18, 2008

(87) PCT Pub. No.: WO2007/036521
PCT Pub. Date: Apr. 5, 2007

(65) Prior Publication Data
US 2008/0224018 A1 Sep. 18, 2008

(30) Foreign Application Priority Data
Sep. 28, 2005 (FR) .................................. 05 52932

(51) Int. Cl.
*F02C 7/20* (2006.01)
(52) U.S. Cl. .................... 60/796; 60/226.1; 244/54
(58) Field of Classification Search ............ 60/266, 60/226.1, 796, 797; 244/53 R, 54; 248/554, 248/555
See application file for complete search history.

(56) References Cited

U.S. PATENT DOCUMENTS

| | | | | |
|---|---|---|---|---|
| 3,893,638 A | * | 7/1975 | Kelley | 244/12.5 |
| 4,458,863 A | * | 7/1984 | Smith | 244/54 |
| 5,123,242 A | * | 6/1992 | Miller | 60/226.1 |
| 5,452,575 A | * | 9/1995 | Freid | 60/797 |
| 5,524,847 A | * | 6/1996 | Brodell et al. | 244/54 |
| 5,782,077 A | * | 7/1998 | Porte | 60/782 |
| 6,095,456 A | * | 8/2000 | Powell | 244/54 |
| 6,398,161 B1 | | 6/2002 | Jule et al. | |
| 2003/0201366 A1 | | 10/2003 | Connelly et al. | |
| 2006/0101803 A1 | * | 5/2006 | White | 60/204 |
| 2007/0245738 A1 | * | 10/2007 | Stretton et al. | 60/728 |

FOREIGN PATENT DOCUMENTS

EP 1 129 942 9/2001
FR 2 698 068 5/1994

OTHER PUBLICATIONS

U.S. Appl. No. 12/601,355, filed Nov. 23, 2009, Journade, et al.

* cited by examiner

*Primary Examiner*—William H Rodríguez
*Assistant Examiner*—Phutthiwat Wongwian
(74) *Attorney, Agent, or Firm*—Oblon, Spivak, McClelland, Maier & Neustadt, L.L.P.

(57) ABSTRACT

An engine assembly including an engine mount, the engine mount including a rigid structure including a box and a mounting system positioned between the engine and the rigid structure. This mounting system includes an aft attachment. The assembly further includes a thermal protection system for the box, including a preferably ventilated duct forming a heat barrier and extending between the box and the engine. The duct extends rearward beyond the aft engine attachment.

15 Claims, 6 Drawing Sheets

MOUNTING ASSEMBLY FOR SECURING AN ENGINE TO AN AIRCRAFT WING

TECHNICAL AREA

The present invention generally relates to the area of engine securing pylons intended to be positioned between an aircraft wing and an engine, and more particularly to an engine assembly comprising said engine securing pylon.

The invention can be used on any type or aircraft equipped with turbojet engines for example or turboprop engines.

This type of securing pylon, also called <<EMS>> for Engine Mounting Structure can be used for example to suspend a turbojet engine below an aircraft wing, or to mount this turbojet engine above this same wing.

STATE OF THE PRIOR ART

Said engine mount is provided to form a connecting interface between an engine such as a turbojet engine and an aircraft wing. It allows the loads generated by its associated turbojet engine to be transmitted to the airframe, and also provides a path for fuel lines, electric and hydraulic systems, and air between the engine and the aircraft.

To ensure load transmission, the engine mount comprises a rigid structure often of <<box>> type, i.e. formed by the assembly of upper and lower spars and of two side panels joined together via transverse ribs.

Also, the engine mount is provided with a mounting system inserted between the turbojet engine and the rigid structure of the engine mount, this system globally comprising at least two engine attachments, generally a forward attachment and an aft attachment.

Additionally, the mounting system comprises a thrust mount device to transfer the thrust loads generated by the turbojet engine. In the prior art, this device is in the form of two side thrust links for example, joined firstly to an aft part of the fan case of the turbojet engine and secondly to the aft engine attachment fixed to the engine case.

Similarly, the engine mount also comprises a second mounting system inserted between the rigid structure of this engine mount and the aircraft wing, this second system usually consisting of two or three attachments.

Finally, the engine mount is provided with a secondary structure to separate and support the different systems whilst carrying aerodynamic cowling, the aft aerodynamic cowling usually projecting towards the aft from the trailing edge of the wing.

Additionally, the engine assembly is generally equipped with a thermal protection system for the box comprising a duct that is preferably ventilated and located to the front of this same box, below the lower spar. However this duct, in which the airflow rate is low, only provides restricted cooling of the rigid structure and at all events is solely positioned at the forward part of the rigid box.

SUMMARY OF THE INVENTION

The purpose of the invention is therefore to propose an aircraft engine assembly which, at least in part, overcomes the above-mentioned drawbacks related to prior art embodiments, and also to present an aircraft having at least one said engine assembly.

For this purpose, the subject-matter of the invention is an aircraft engine assembly comprising an engine and an engine mount, this engine mount comprising firstly a rigid structure, also called a primary structure, having a box preferably provided with a lower structural element of lower spar type, and secondly comprising a mounting system inserted between the engine and the rigid structure, this mounting system notably comprising an aft engine attachment, and the assembly also being provided with a thermal protection system for the box comprising a duct that is preferably ventilated and forming a heat barrier extending between the box and the engine, hence preferably extending underneath this lower spar and along its length if the engine is intended to be suspended below the wing of the aircraft. According to the invention, the duct extends towards the aft beyond the aft engine attachment.

Therefore, with this arrangement according to the invention very satisfactory cooling of the box can be achieved, since it is a very large part of the lower spar which is protected by the duct, and naturally in the case of an engine which is to be suspended below the wing. The presence of this duct therefore contributes towards the possible use of a composite material to manufacture the box of the rigid structure, whose weight can therefore be largely reduced compared with the metal rigid structures of the prior art.

Also, it is to be appreciated that the aft end of this duct leads to beyond the aft engine attachment, to a point where pressures are substantially lower than those encountered upstream of this engine attachment. As a result, the pressure differential obtained is considerably greater than found in the prior art, owing to the strong suction encountered at the outlet of the duct when it is of <<ventilated>> type i.e. with an airflow passing through it, thus permitting a substantial increase in this airflow and hence an increase in the efficacy of the thermal protection system of the box.

Additionally, since the aft end of the duct is located aft of the aft engine attachment, it is easy to cause this end to lead into the engine stream, and thereby to use the air ejected from the ventilated duct as additional thrust generator.

Preferably, the ventilated duct has an aft end leading to the outer wall of an aft aerodynamic fairing of the engine mount, this aft aerodynamic fairing being entirely located aft relative to the aft engine attachment.

This configuration is extremely advantageous from an aerodynamic viewpoint. The above-mentioned fairing, also called a <<shield>> or <<Aft Pylon Fairing>> and usually projecting towards the aft of a trailing edge of the wing, is generally impacted by the engine stream, which causes non-negligible drag that is relatively restricting in terms of performance. By making provision for this end to lead to the outer wall of the fairing, it becomes possible to bathe the fairing in an airspace protecting it from the engine stream. As a result, the drag generated by the reduced impact of the hot engine stream on the lower aft fairing is largely reduced compared with the prior art, which advantageously gives rise to performance gains.

In this respect, for the purpose of simultaneously increasing the thrust generated by the ventilated air, improving the efficacy of the thermal protection system, and enhancing protection of the aft aerodynamic fairing against the impact of the engine stream, the aft end of the ventilated duct is preferably positioned at an interruption/separation of this fairing so as to set up increased suction and hence to obtain an even greater pressure differential.

One alternative to the above-mentioned solution could consist of making provision for the aft end of the ventilated duct to lead inside the aft pylon fairing of the engine mount. In said case, it is then expedient to provide an air outlet rearward of this fairing to ensure extraction of the ventilated air, this opening possibly being coupled with a controllable mobile structure which, in relation to its position, can modify the aerodynamic shape of said fairing. With said arrangement, in which the mobile structure is preferably positioned across the opening, the piloting of the mobile structure can therefore reduce/increase suction of the air leaving the opening provided on this fairing, depending on whether this fairing is in a configuration defining one or more interruptions intended to create a base drag effect so as to generate extensive air suction, or in a configuration defining a substantially continuous aerodynamic shape without any interruption, to cause the least drag possible.

Preferably, the engine mount is designed such that the rigid structure of the engine mount also comprises a block fixedly mounted on the box between the box and the engine, and preferably underneath the lower spar of the box if the engine is to be suspended below the aircraft wing, this structural block then being called a lower structural block having a securing interface for the aft engine attachment.

Therefore, in the non-limiting case in which the engine is intended to be suspended below the aircraft wing, this arrangement globally allows the aft engine attachment to be offset downwardly relative to the box, by means of the lower structural block which therefore forms an integral part of the rigid structure being similar to a stem or shoe. The adding of this block compared with prior art embodiments, in which the rigid structure consists solely of the box, is able to provide numerous advantages, including the advantage of spacing this same box away from the engine suspended from the engine mount. As a result, the heat conditions to which the box is subjected are far less severe than encountered previously in embodiments in which the securing interface for the aft engine attachment is located directly on the lower spar. With these less severe heat conditions, it is therefore possible to consider the use of materials less sensitive to heat for the manufacture of the rigid box, such as the composite materials already mentioned above. In said case, this can advantageously lead to a very substantial weight gain for the entire engine mount.

Additionally, it allows a separation to be made between the design of the structural block, essentially dictated by the need to ensure transmission of loads derived from the aft engine attachment, from the design of the box that is chiefly sized in relation to the wing interface it is to carry. This particular aspect implies that the block has a much smaller width than the width of the box, thereby providing a considerable advantage in terms of aerodynamic performance levels, since it is the block of small width which comes to be located in the flow of the secondary air stream, and no longer the lower part of the box of greater width. Aerodynamic disturbances directly above the aft engine attachment are therefore greatly reduced compared with those previously encountered.

Also, it is evidently to be understood that the geometry of the box is no longer influenced by the need to lie close to the engine case, since this function can be fully taken up by the lower structural block fixedly secured onto this box. The geometry of the box can therefore be considerably simplified, as can its manufacture, notably by providing a planar lower box face from one end to the other of the rigid structure. Its weight is therefore reduced and perfectly optimised, insofar as the lower part of the box advantageously no longer contains an offset of substantial width exclusively intended to bring it close to the engine case Finally, it is indicated that since the block projects downwardly from the box and only extends over a short longitudinal length of the rigid structure, consideration can easily be given to the possible passing of conduits or similar elements through this same structural block. This option made available to the equipment of the engine mount, such as a heat exchanger system, therefore facilitates access to the aft part of the rigid structure which, in the prior art, required passing through a box having relatively difficult access.

In addition, this option is also made available to the thermal protection system of the box, whose ventilated duct can therefore be passed through the structural block, this solution forming a relatively simple manner in which to bring the aft end of the ventilated duct downstream of the aft engine attachment carried by this same block.

Again preferably, the preferably ventilated duct is located below and away from the lower spar of the box, so that together with the latter it forms a secondary ventilated throughway. With this arrangement, the secondary ventilated throughway then forms a zone called a <<fire adjacent zone>>, whilst the box comes to lie in a so-called <<zone non-adjacent to fire>>, in which restrictions are evidently less severe. This specificity advantageously allows the passing of various elements through the box of the rigid structure without infringing safety standards. Also, the design of this box is no longer dictated by any fire requirements as was the case previously. It is to be noted by way of indication that if the engine is to be mounted above the wing, the ventilated duct and the secondary ventilated throughway are evidently positioned above the upper spar of the box.

Preferably, the secondary ventilated throughway is also delimited laterally by cowls of an engine nacelle.

Finally, to further reinforce the efficacy of the thermal protection system for the box, the box can be provided with a thermal protection coating on the duct forming the heat barrier called a <<fire barrier>>, applied for example to a lower outer surface of this duct i.e. facing the engine.

A further subject of the invention is an aircraft comprising at least one engine assembly such as just presented.

Other advantages and characteristics of the invention will become apparent in the detailed, non-limiting, description given below.

BRIEF DESCRIPTION OF THE DRAWINGS

This description is made with reference to the appended drawings amongst which.

DETAILED DESCRIPTION OF PREFERRED EMBODIMENTS

Figure 1:
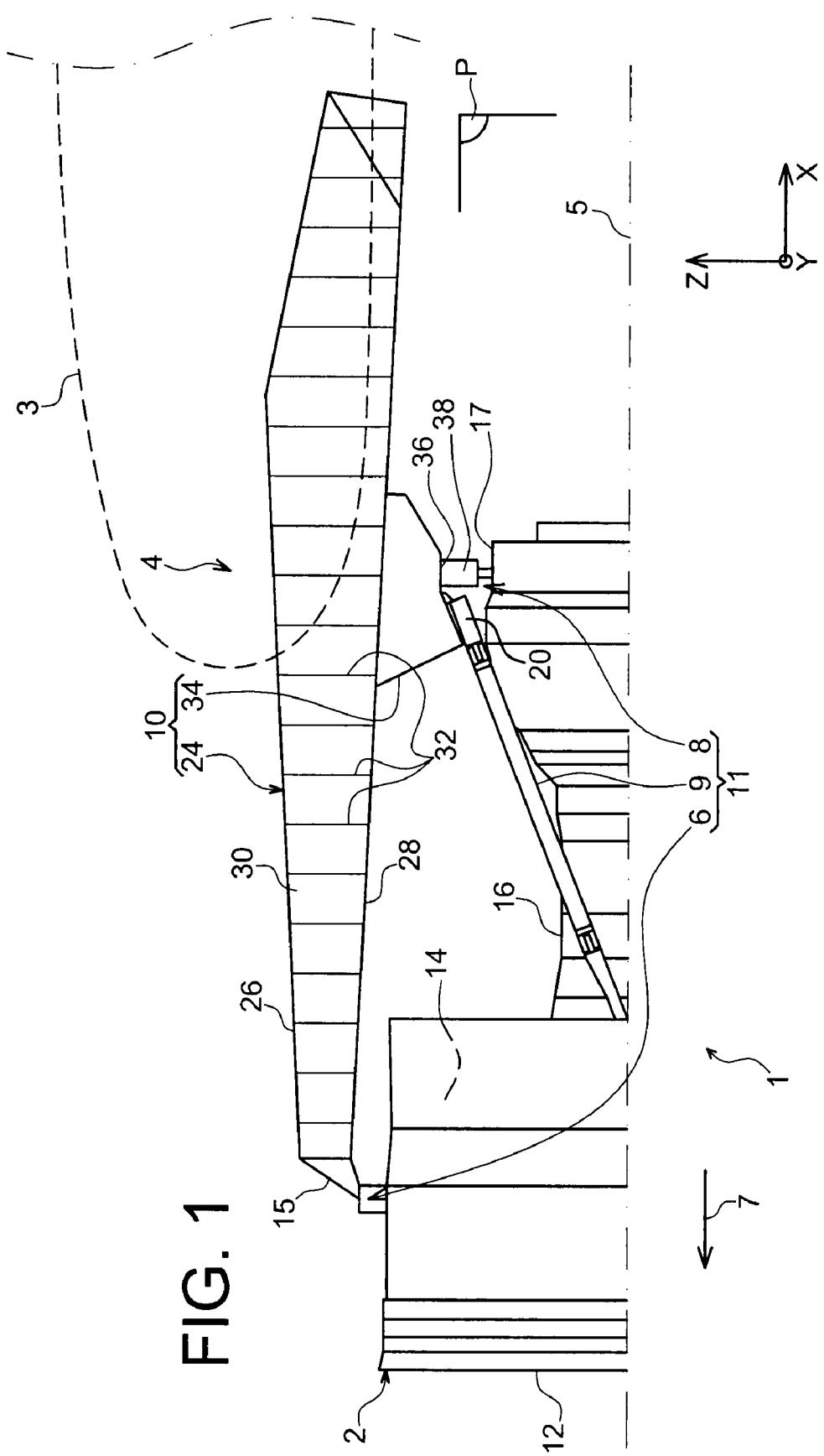
FIG. 1 is a side view of an aircraft engine assembly according to one preferred embodiment of the present invention, the thermal protection system of the box having been deliberately omitted for reasons of clarity.

With reference to FIG. 1, an aircraft engine assembly 1 can be seen intended to be attached below a wing 3 of this aircraft, this assembly 1, provided with an engine mount 4, being in the form of a preferred embodiment of the present invention.

Globally, the engine assembly 1 comprises an engine such as turbojet engine 2 and the engine mount 4, this mount being notably provided with a rigid structure 10 and a mounting system 11 consisting of a plurality of engine attachments 6, 8 and a thrust mount device 9 transferring thrust loads generated by the turbojet engine 2, the mounting system 11 therefore being positioned between the engine and the above-mentioned rigid structure 10. By way of indication, it is noted that the assembly 1 is intended to be surrounded by a nacelle (not shown in this figure) and that the engine mount 4 comprises another series of attachments (not shown) used to suspend this assembly 1 below the aircraft wing.

In the remainder of the description, by convention, X designates the longitudinal direction of the engine mount 4 which is comparable with the longitudinal direction of the turbojet engine 2, this direction X being parallel to a longitudinal centreline 5 of this turbojet engine 2. Also, Y designates the direction oriented transversally relative to the engine mount 4 and is also comparable with the transverse direction of the turbojet engine 2, and Z is the vertical direction or height, these three directions X, Y et Z lying orthogonal to each other.

Also the terms <<forward>> and <<aft>> are to be considered with respect to a direction of travel of the aircraft subsequent to the thrust exerted by the turbojet engine 2, this direction being schematically illustrated by arrow 7.

In FIG. 1, it can be seen that only the thrust mount device 9, engine attachments 6,8 and the rigid structure 10 of the engine mount 4 are shown. The other constituent elements of this engine mount 4 that are not shown, such as the means to mount the rigid structure 10 below the aircraft wing, or the secondary structure ensuring the separation and support of the different systems whilst carrying aerodynamic cowling, are conventional elements identical or similar to those found in the prior art, and known to persons skilled in the art. Therefore no detailed description will be given thereof, except regarding the aft aerodynamic fairing which may entail a particular aspect related to the present invention.

The turbojet engine 2 forwardly has a fan case 12 of large size delimiting an annular fan duct 14, and aftward comprising a central case 16 of smaller size enclosing the core of this turbojet engine. Finally, the central case 16 is extended aftward via an exhaust case 17 of larger size than the central case 16. Cases 12, 16 and 17 are evidently secured to one another.

As can be seen FIG. 1, the plurality of engine attachments consists of a forward engine attachment 6 and an aft engine attachment 8 possibly forming two aft semi-attachments such as is known from the prior art. The thrust mount device 9 is in the form of two side thrust links for example (only one being visible since it is a side view) joined firstly to an aft part of the fan case 12, and secondly to an evener bar 20, itself mounted on the rigid structure 10.

The forward engine attachment 6, secured to the bracket 15 of the rigid structure 10 and to the fan case 12, is of conventional design so that it can ensure the transfer solely of those loads generated by the turbojet engine 2 exerted in directions Y and Z, and not those loads exerted in direction X. By way of indication, this forward attachment 6 preferably enters into an end circumferential portion of the fan case 12.

The aft engine attachment 8 is globally positioned between the exhaust case 17 and the rigid structure 10 of the engine mount. As indicated previously, it is preferably designed so that it is able to transfer the loads generated by the turbojet engine 2 in directions Y and Z, but not those loads exerted in direction X.

In this manner, with the mounting system 11 of isostatic type, the transfer of loads exerted in direction X is achieved via the thrust mount device 9, and the transfer of loads exerted in directions Y and Z is ensured jointly via the forward attachment 6 and the aft attachment 8.

Also, the transfer of the moment exerted in direction X is made vertically via attachment 8, the transfer of the moment exerted in direction Y is made vertically via the aft attachment 8 jointly with attachment 6, and transfer of the moment exerted in direction Z is made transversely via attachment 8 jointly with attachment 6.

Sill with reference to FIG. 1, it can be seen that the structure 10 firstly has a box 24 extending from one end to the other of this structure 10 in direction X, and therefore forms a torque box called the main box of the structure. It is conventionally formed of an upper spar 26, a lower spar 28 and two side panels 30 (only one being visible FIG. 1) both extending in direction X and substantially along a plane XZ. Inside this box, transverse ribs 32 arranged along planes YZ and spaced apart longitudinally come to reinforce the rigidity of the box 24. It is to be noted by way of indication that elements 26, 28 and 30 may each be made in one piece, or they can be assembled by joining sections, which may optionally lie at a slight angle to each other.

Preferably, as can be clearly seen FIG. 1, the lower spar 28 is planar over its entire length, its plane lying substantially parallel to a plane XY or lying slightly at an angle thereto.

In this case in which the engine is intended to be suspended below the wing, provision is made to mount fixedly, on the outer surface of the lower spar 28, a structural block 34 called a lower structural block 34 owing to its position below the box 24. However, it is noted that in a non-described case but covered by the present invention, in which the engine 2 is mounted above the wing 3, the structural box would then be fixedly secured onto the upper spar 26 of the box.

Block 34 has a securing interface 36 for the aft attachment 8, this interface 36 therefore lying below the plane in which the spar 28 is contained, and preferably oriented along a plane XY. As will be described further on, it is specified that this securing interface 36 is intended to cooperate with an attachment body of the aft engine attachment 8.

This solution in which the width of block 34 in direction Y is smaller than the width of the box 24, allows the attachment 8 to be offset downwardly relative to the box 24, and hence to space the engine 2 away from the box.

The heat stresses applied to the box 24 are therefore relatively low, so that it becomes possible to manufacture the box in a composite material, or in any other heat-sensitive material able to generate a gain in terms of global weight of the engine mount 4. On the other hand, the block 34 which is more exposed to heat stresses on account of its vicinity with the engine 2, can be made in a metal material, preferably titanium.

Figure 2:
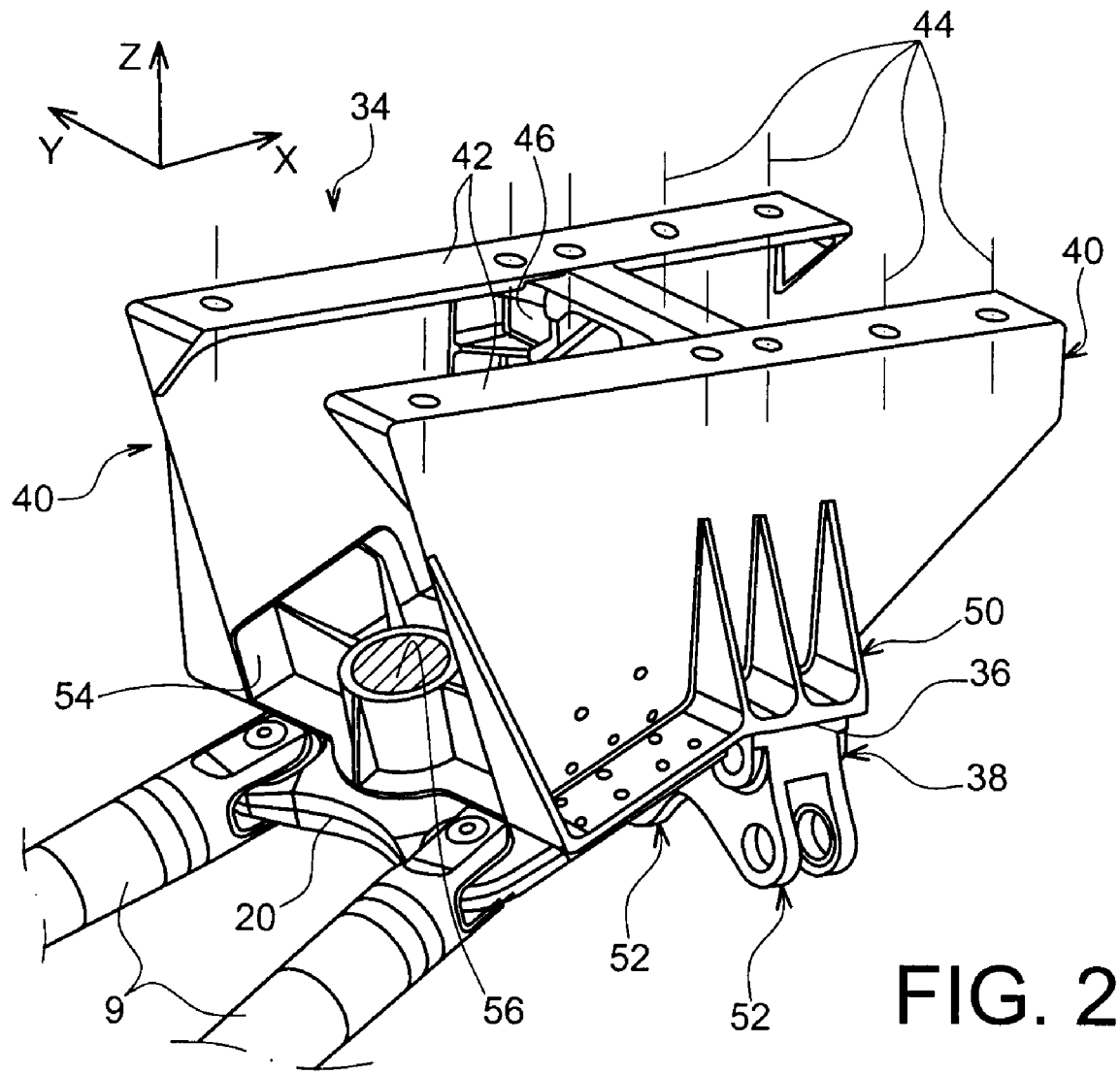
FIG. 2 is a magnified, perspective view of the lower structural block belonging to the rigid structure of the mount for the engine assembly shown FIG. 1.

With reference to FIG. 2, it can be seen that the structural block 34 fixed below the lower spar 28 globally has two side walls 40, each equipped in its upper part with a securing fin 42 oriented along the plane of this same spar 28 so that it can contact this spar and ensure securing of the block 34 onto the box 24. In this respect, this securing is preferably achieved via a plurality of tension bolts and shear pins (not shown) arranged perpendicular to the lower spar 28, along axes 44 passing through the fins 42. These securing means advantageously allow a reduction in heat conduction between the 34 and the lower spar 28, this conduction possibly being further reduced by inserting insulating rings or gaskets between these two elements 24, 34.

Also, the block 34 comprises one or more transverse ribs 46 arranged between the two side walls 40, and preferably oriented along planes YZ.

The securing interface 36 is defined by a lower portion 50 of the two side walls 40, optionally in combination with one of the ribs 46 preferably being in the form of a frame. Therefore this securing interface 36 formed by the two lower portions 50 of the side walls 40 and by the lower part of the rib 46 under consideration, globally forms a horizontal strip extending in direction Y on which the attachment body 38 of the aft engine attachment 8 is fixed, preferably via bolts.

This attachment body 38 is of known type and its design is substantially identical to the design previously encountered in prior art embodiments in which this body is mounted directly on the lower spar 28 of the box. Therefore, this attachment body defines clevises 52 on which links (not shown) are hinged, which are also intended to be hinged on brackets secured to the engine.

Additionally, a securing bracket 54 of the evener bar 20 is also arranged between the side walls 40, preferably ahead of the attachment body 38. This bracket 54 carries a pivot 56 of the evener bar 20, itself pivoted at its two ends with the two thrust links 9.

Finally, it is indicated that this block 34 may be in the form of a secondary rigid box, and may incorporate forward and aft closure plates (not shown) secured to the side walls 40, respectively closing the box forward and aft.

Figure 3:
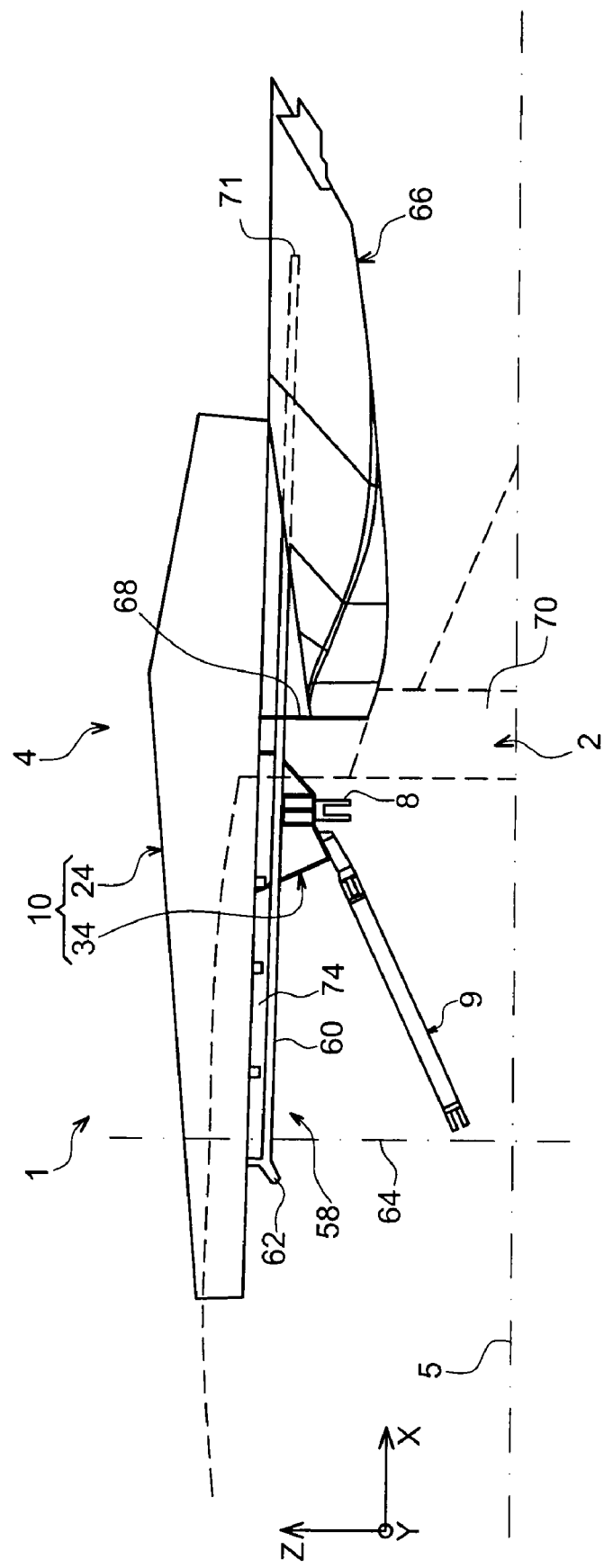
FIG. 3 is a similar view to the one in FIG. 1, showing the thermal protection system of the box.

With reference to FIG. 3, it can be seen that the engine assembly 1 also comprises a thermal protection system 58 for the box 24, which contributes towards the possible use of a composite material for the manufacture of this box.

Globally, this system 58 comprises a preferably ventilated duct 60 extending underneath the lower spar 28, and preferably parallel to it. The duct 60, also called a skirt, preferably has a cross section that is substantially in the form of a rectangle whose length extending in direction Y is preferably greater than the width of the box 24.

The duct 60 has a forward end provided with an air intake 62 located in the vicinity of the junction between the fan part of the engine and the thrust reverser part, this junction being schematically represented by line 64. Therefore, as can be seen FIG. 3, this air intake 62 is preferably arranged underneath the box 24, upstream of junction 64 and at the outlet of the annular fan duct (not shown) so as to be supplied with the fresh air output by this fan duct.

One of the particular aspects of the invention lies in the fact that the ventilated duct 60 extends aftward beyond the aft engine attachment 8, which in particular provides for increased efficacy of the protection system 58.

For this purpose, as can be seen FIG. 3, provision is made for this duct 60 to pass through the structural block 34 longitudinally, which is relatively easy to achieve owing to the short length of the block 34 in direction X.

In this same FIG. 3, one of the aerodynamic fairings is shown equipping the engine mount 4, which is more specifically known as a <<shield >> or <<Aft Pylon Fairing>>. This fairing 66 arranged underneath the box 24 lies fully aft relative to the attachment 8, and usually projects aftward from a trailing edge of the wing 3. Therefore it does not form part of the rigid structure of the engine mount, but is connected to it via a support bracket 68 fixedly mounted underneath the box 24, towards the aft relative to the block 34. In known manner, its lower front part lies substantially tangent to an upper part of the exhaust nozzle 70 of the engine 2.

In this preferred embodiment, the ventilated duct 60 is such that it extends beyond the block 34 until it enters inside the fairing 66, so that the outlet end of this duct is located for example in the vicinity of an aft portion of the fairing 66.

Figure 4:
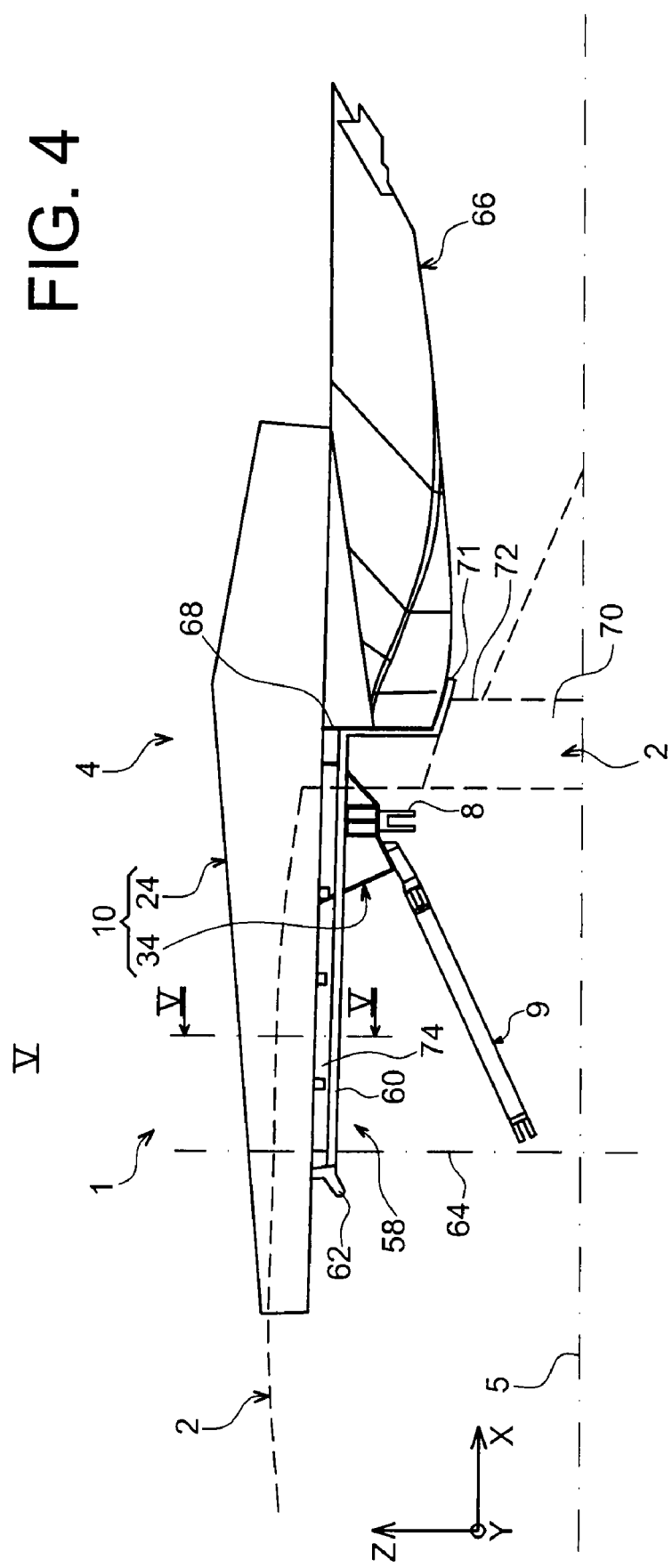
FIG. 4 is a side view of an aircraft engine assembly, this assembly being in the form of an alternative to the preferred embodiment shown FIGS. 1 to 3.

In FIG. 4 illustrating an alternative to the preferred embodiment shown FIGS. 1 to 3, it can be seen that the ventilated duct 60 does not enter inside the fairing 66, but has a bend downstream of block 34 enabling it to run downward along the support bracket 68. Another bend is provided so that an end portion of this conduit 60 is able pass between the lower forward part of the fairing 66 and the upper part of the exhaust nozzle 70. Therefore, provision is made so that an outlet 71 of this duct 60 leads to the outer wall of the fairing 66, preferably on a side or lower part thereof, and downstream of an exhaust end 72 of the nozzle 70. Additionally, the outlet/aft end 71 of the ventilated duct 60 is preferably arranged at a discontinuity/interruption made in the outer wall of the fairing 66, so as to create a base drag effect and hence increased suction of the air leaving the duct 60, which evidently allows a greater pressure differential to be obtained together with increased efficacy of the thermal protection system 58.

Additionally, it is recalled that the particular positioning of the outlet 71 at the outer wall of the fairing 66, enables the fairing to be bathed in an airspace protecting it from the engine stream, which advantageously entails a reduction in the drag generated by the impact of the hot engine stream on this fairing 66.

In each of the two cases shown FIGS. 3 and 4, the ventilated duct 60 is designed to be positioned underneath and away from the spar 28, so as to form therewith a secondary ventilated throughway 74, which takes part in the cooling of the box 24 with which it is therefore directly in contact. This throughway 74 is preferably supplied with fresh air from an intake outside the engine 2.

Figure 5:
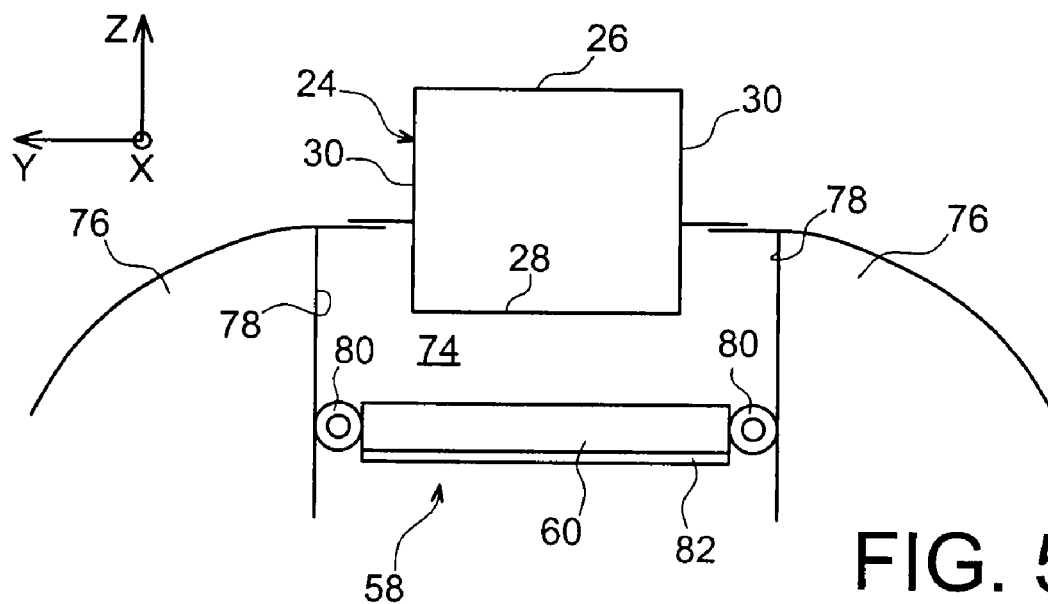
FIG. 5 is a schematic sectional view along line V-V of FIG. 4.

As can be seen FIG. 5, the two thrust reverser cowls 76 of the engine nacelle, on their inner side walls 78, respectively carry seals 80 extending longitudinally and coming to bear against the two sides of the duct 60, being oriented along planes XZ. Therefore the throughway 74 is substantially closed and sealed over its entire periphery, in particular due to the pivoted interface of the cowls 76 on the side panels 30 of the box 24.

The secondary ventilated throughway 74 therefore forms a so-called <<fire adjacent zone>>, and the box 24 is located in a so-called <<non-fire adjacent zone>> in which safety constraints are evidently less severe. The <fire zone>> is located below the duct 60 which may optionally be equipped with a thermally protective facing 82 e.g. of MINK® type (produced by Gehier) corresponding to a mixture of glass fibre and silicon. As can be seen FIG. 5, this facing 82 is preferably arranged underneath the duct 60, i.e. between the lower part of this duct and the engine 2.

Figure 6A:
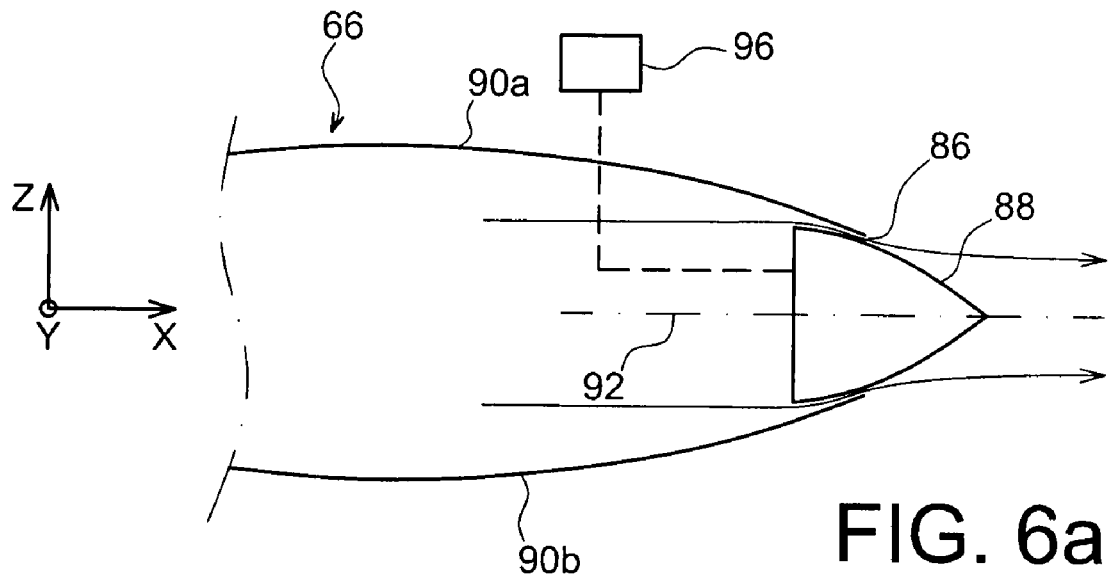
FIGS. 6a and 6b are overhead views of an aft portion of the aft pylon fairing of the engine mount, belonging to the assembly shown FIG. 3, more specifically illustrating a mobile, controllable structure able to reduce/increase suction of air leaving the fairing.
Figure 6B:
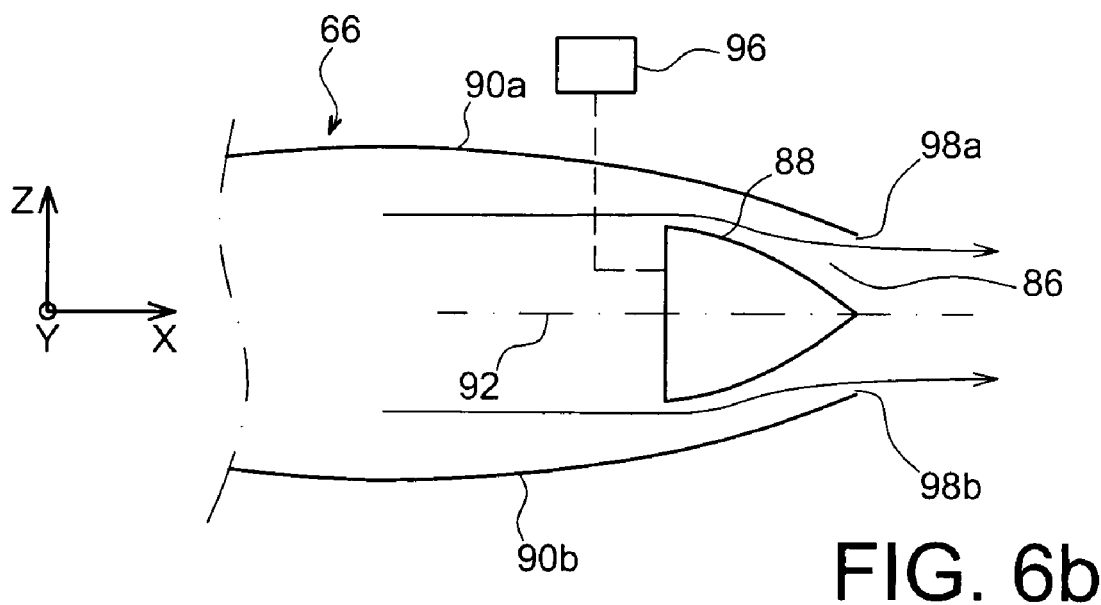

Since the air extracted from the ventilated duct 60 is used to generate thrust, the above-described case in which this duct leads to inside the fairing 66, requires the provision of an opening for an air outlet on this fairing. With reference to FIGS. 6a and 6b, a first manner can be seen in which to form the aft portion of the pylon fairing 66, this fairing therefore being provided with said air outlet 86 in its aft end portion.

In this embodiment, it can be seen that the opening 86 is coupled to a controllable mobile structure 88 which, in relation to its position, is able to modify the aerodynamic shape of the fairing 66. This structure is preferably in the shape of an ogive or similar which, when it takes up an aft position called aerodynamic deployed position, it projects from the opening 86 so that it lies substantially in the aerodynamic continuity of the side facings 90a and 90b of the fairing 66, as can be seen FIG. 6a. This structure 88, which can be piloted in translation in a direction 92 preferably substantially parallel to direction X, for example using actuating means 96 connected to it, therefore allows a fairing 66 of substantially continuous aerodynamic shape to be obtained, with no interruption, which generates little drag. By way of indication, this aerodynamic position is preferably taken up during fast travel speeds of the aircraft when drag is low and the flow generated in the duct 60 is sufficiently high to provide satisfactory cooling of the box 24.

In FIG. 6b showing the mobile structure 88 in a forward position called a retracted suction position, it can be seen that this structure 88 is practically fully retracted relative to the opening 86 which therefore has a larger section, this particularly implying that the aerodynamic continuity of the side facings 90a and 90b of the fairing 66 is no longer ensured. On the contrary, an aerodynamic interruption or discontinuity 98a, 98b appears at the aft end of each of these two facings 90a, 90b, which generates base drag effects caused by the air licking the outer wall of these facings 90a, 90b. These base drag effects therefore ensure increased suction of the air leaving the opening 86, thereby contributing towards the efficacy of the protection system 58.

As a result, this suction position is preferably taken up during low speed phases of the aircraft. At low speeds, the drag caused by the interruptions 98a, 98b is no longer penalising, and the suction that they create allows the pressure differential to be increased which, without the presence of these interruptions, would be small due to the low speed of the aircraft.

Figure 7:
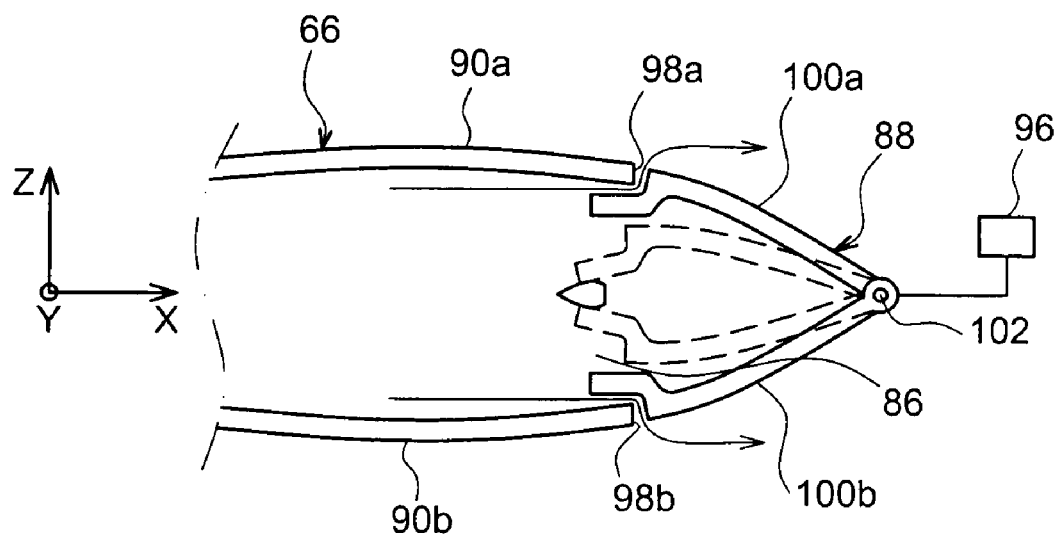
FIG. 7 is a similar view to those shown FIGS. 6a and 6b, the controllable, mobile structure being in the form of an alternative embodiment.

With reference now to FIG. 7, a second manner can be seen in which to form the aft portion of the aerodynamic fairing 66, this fairing also being provided with an opening for an air outlet 86 in its aft end portion.

In this embodiment, it can be seen that the opening 86 is coupled with a mobile structure 88 which is no longer in the form of an ogive but of two panels 100a, 100b hinged together at their aft end about an axis 102 preferably parallel to direction Y, these panels 100a, 100b projecting permanently from the opening 86.

In the drawn-apart position represented by solid lines, called the aerodynamic deployed position, the two panels 100a, 100b have a forward end bearing against the aft end of the facings 90a, 90b of the fairing 66, so that it lies substantially in the aerodynamic continuity of the facings. This structure 88, which can therefore be piloted in rotation about axis 102, e.g. via actuating means 96 linked to it, therefore allows a fairing 66 to be obtained of substantially continuous aerodynamic shape with no interruption, which generates little drag.

In the drawn-together position called the retracted suction position, represented by dashed lines in FIG. 7, it can be seen that the two forward ends of the panels 100a, 100b which have been drawn together by pivoting are respectively spaced far away from the aft ends of the facings 90a, 90b, which in particular implies that the opening 86 has a larger section, but more especially that the aerodynamic continuity of these side facings 90a and 90b of the fairing 66 is no longer ensured. On the contrary, an aerodynamic discontinuity 98a, 98b appears between the aft end of each of these two facings 90a, 90b and its associated panel 100a, 100b located more aftward, which generates drag base effects caused by the air licking the outer wall of these facings 90a, 90b.

Evidently, various modifications can be made by those skilled in the art to the aircraft engine assemblies 1 just described solely as non-limiting examples. In this respect, it can be indicated in particular that while the engine mount 4 has been presented in a configuration adapted for its mounting below the aircraft wing, this engine mount 4 could also have a different configuration enabling it to be mounted above this same wing, even at an aft part of the aircraft fuselage.

The invention claimed is:

1. An aircraft engine assembly comprising:
   an engine;
   a mount for the engine, the mount for the engine including a rigid structure including a box and a mounting system positioned between the engine and the rigid structure, the mounting system including an aft engine attachment; and
   a thermal protection system for the box including a duct forming a heat barrier and extending between the box and the engine,
   wherein the duct extends aftward beyond the aft engine attachment,
   wherein said box extends vertically between an upper spar and a lower spar, and said duct is located underneath said lower spar, wherein said rigid structure includes a structural block mounted on the lower spar and connecting said rigid structure to said aft engine attachment, and wherein said duct passes through said structural block.

2. An engine assembly according to claim 1, wherein the duct is a ventilated duct.

3. An engine assembly according to claim 2, wherein the ventilated duct includes an aft end leading to an outer wall of an aft pylon fairing of the mount for the engine, the aft pylon fairing being positioned fully aftward relative to the aft engine attachment.

4. An engine assembly according to claim 2, wherein the ventilated duct includes an aft end leading into inside an aft pylon fairing of the mount for the engine, the aft pylon fairing being positioned fully aftward relative to the aft engine attachment.

5. An engine assembly according to claim 4, wherein the aft pylon fairing includes an air outlet opening including a controllable, mobile structure which, in relation to its position, can modify an aerodynamic shape of the fairing.

6. An engine assembly according to claim 5, wherein the mobile structure is placed across the air outlet opening.

7. An engine assembly according to claim 1, wherein the structural block includes a securing interface for the aft engine attachment.

8. An engine assembly according to claim 1, wherein the duct is positioned underneath and away from a lower structural element of the box, so as to define jointly therewith a secondary ventilated throughway.

9. An engine assembly according to claim 8, wherein the secondary ventilated throughway is also delimited laterally by cowls of a nacelle of the engine.

10. An engine assembly according to claim 1, wherein the duct includes a thermal protection coating.

11. An aircraft comprising at least one engine assembly according to claim 1.

12. An engine assembly according to claim 1, wherein said duct is located outside said box.

13. An engine assembly according to claim 1, wherein said duct has an air intake located underneath the box.

14. An engine assembly according to claim 12, wherein said box is made of a composite material.

15. An engine assembly according to claim 1, wherein said box is made of a composite material, and said structural block is made of metal.

* * * * *